(12) United States Patent
Chiang

(10) Patent No.: US 10,416,435 B2
(45) Date of Patent: Sep. 17, 2019

(54) BINOCULAR EYEPIECE ASSEMBLY AND BINOCULAR TELESCOPE

(71) Applicant: LONG PERNG CO., LTD., Taoyuan (TW)

(72) Inventor: Chun-Hsien Chiang, Taoyuan (TW)

(73) Assignee: Long Perng Co., Ltd., Taoyuan (TW)

( * ) Notice: Subject to any disclaimer, the term of this patent is extended or adjusted under 35 U.S.C. 154(b) by 43 days.

(21) Appl. No.: 15/661,163

(22) Filed: Jul. 27, 2017

(65) Prior Publication Data

US 2018/0031820 A1  Feb. 1, 2018

(30) Foreign Application Priority Data

Jul. 28, 2016 (TW) .............................. 105211430 U

(51) Int. Cl.
| | |
|---|---|
| *G02B 23/04* | (2006.01) |
| *G02B 23/18* | (2006.01) |
| *G02B 7/12* | (2006.01) |
| *G02B 25/00* | (2006.01) |

(52) U.S. Cl.
CPC .............. *G02B 23/04* (2013.01); *G02B 7/12* (2013.01); *G02B 23/18* (2013.01); *G02B 25/001* (2013.01)

(58) Field of Classification Search
CPC .... G02B 25/00; G02B 25/001; G02B 25/002; G02B 25/007; G02B 21/02; G02B 21/025
USPC ........ 359/368, 680, 656–661, 663, 670, 676
See application file for complete search history.

(56) References Cited

U.S. PATENT DOCUMENTS

| | | | | |
|---|---|---|---|---|
| 3,565,507 | A * | 2/1971 | Peck .................... | G02B 21/20 359/374 |
| 5,223,974 | A * | 6/1993 | Phillips ................. | G02B 13/16 359/400 |
| 5,361,162 | A * | 11/1994 | Goebel ................... | G02B 7/12 359/411 |

\* cited by examiner

*Primary Examiner* — Robert E. Tallman
(74) *Attorney, Agent, or Firm* — Rosenberg, Klein & Lee

(57) ABSTRACT

A binocular eyepiece assembly for telescope, the assembly includes a casing, an optical lenses assembly, a beam splitter, a first reflecting mirror unit and a second reflecting mirror unit. The casing has a left ocular portion, a right ocular portion and a light receiving portion. The optical lenses assembly, the beam splitter, the first reflecting mirror unit and the second reflecting mirror unit are disposed inside the casing, and furthermore, the beam splitter is disposed on the light axis of the light axis. The beam splitter has a first reflecting surface, a second reflecting surface and an included angle. The included angle is disposed between the first reflecting surface and the second reflecting surface. The included angle is a right angle. A light beam is received via the light receiving portion, and the light beam will be transmitted to the optical lenses assembly and a beam splitter.

14 Claims, 13 Drawing Sheets

BINOCULAR EYEPIECE ASSEMBLY AND BINOCULAR TELESCOPE

BACKGROUND

Technical Field

The present invention relates to a binocular eyepiece assembly, and in particular, to a single-tube binocular lens assembly for a single-tube telescope.

Related Art

Currently, telescopes may be roughly classified into monocular telescopes (single-tube) and binocular telescopes (dual-tube) in the market. The structure and optical design of a monocular telescope are relatively simple, and the monocular telescope is usually a single optical system constituted by an objective lens system and an eyepiece. In addition to also including an objective lens system and an eyepiece, a binocular telescope needs to split, by using a beam splitter, a beam into two optical systems for left and right eyes to use. Since ancient times, people are more accustomed to observing with both the left and right eyes. Therefore, even though the binocular telescope is more complex and heavier than the monocular telescope, and has worse optical effects, the binocular telescope is still popular with most of people.

First, referring to FIG. 1, FIG. 1 is a schematic diagram of a partial optical member of a conventional binocular telescope. It should be first noted that FIG. 1 shows only a brief optical diagram of an eyepiece of a conventional binocular telescope 1, in which no other construction is drawn, and should be easily understood by persons of ordinary skill in the art.

First, the conventional binocular telescope 1 splits an incident beam into two sub-beams by using a beam splitter 11, and the two sub-beams then enter left and right eyes of a user respectively through a reflecting prism 13, a reflecting prism 12, and a reflecting mirror 14.

Specifically, by means of surface coating, the beam splitter 11 may partially transmit and partially reflect an incident beam (a coated part reflects an incident light ray), so as to split the beam into two sub-beams. However, such an approach has at least the following disadvantages: First, a splitting ratio of the beam splitter is unfavorable, and splitting quality of the beam splitter depends on a coating technology. Besides, the sub-beams in this design separately form half images at the eyepieces, and the user needs to observe with both left and right eyes, so as to observe an entire image. Further, it is difficult to miniaturize the beam splitter, and therefore, the entire volume of the telescope cannot be miniaturized. In addition, when a binocular telescope with such configuration is assembled, the position of the beam splitter needs to be corrected particularly, and if the position of the beam splitter deviates, the splitting ratio is affected, resulting in uncomfortable observation experience of the user. Moreover, costs are higher if the beam splitter is used.

Therefore, to overcome the disadvantages in the prior art, one objective of the present invention is to provide a binocular eyepiece assembly that may be used in a single-tube telescope and that may enable more comfortable observation for a user. In addition, another purpose of the present invention is to provide a single-tube binocular eyepiece assembly that is designed with a structure and an optical path that are complete and simple, and that may be miniaturized, and a telescope matched with the single-tube binocular eyepiece assembly.

SUMMARY

The present invention provides a single-tube binocular eyepiece assembly for a single-tube telescope, comprises a casing, comprising a right ocular portion, a left ocular portion, and a light receiving portion; an optical lens assembly, disposed in the casing; a beam splitting prism, disposed in the casing, wherein the beam splitting prism is disposed on an optical axis of the optical lens assembly, the beam splitting prism comprises a first reflecting surface, a second reflecting surface, and a vertex angle, the first reflecting surface and the second reflecting surface form the vertex angle, and the vertex angle is a right angle a first reflecting mirror assembly, disposed in the casing; and a second reflecting mirror assembly, disposed in the casing.

Wherein the light receiving portion receives a beam, the beam is sequentially transmitted to the optical lens assembly and the beam splitting prism, the beam is then transmitted to the first reflecting surface and the second reflecting surface of the beam splitting prism, the beam reflected by the first reflecting surface is defined as a first beam, the beam reflected by the second reflecting surface is defined as a second beam, the first beam is transmitted to the first reflecting mirror assembly, and the second beam is transmitted to the second reflecting mirror assembly.

In one embodiment of the present invention wherein the beam transmitted to the optical lens assembly is turned by 180 degrees in a vertical direction and turned by 180 degrees in a horizontal direction.

In one embodiment of the present invention wherein the beam transmitted to the optical lens assembly can form a full circle erect image.

In one embodiment of the present invention wherein the first beam forms a first image through the first reflecting mirror assembly, the second beam forms a second image through the second reflecting mirror assembly, and the first image and the second image are the same.

In one embodiment of the present invention, the single-tube binocular eyepiece assembly further comprises an interpupillary distance adjustment apparatus, disposed in the casing. The interpupillary distance adjustment apparatus comprises a connecting rod unit, wherein the connecting rod unit comprises a first connecting rod, a second connecting rod, and a third connecting rod, two ends of the second connecting rod are separately connected to the first connecting rod and the third connecting rod, and the second connecting rod is pivoted in the casing by using a pivot component, so that the second connecting rod can rotate around the pivot component as an axis; and a slide unit, comprising a first slide and a second slide.

In one embodiment of the present invention, a part of the first connecting rod is disposed in the first slide, a part of the third connecting rod is disposed in the second slide, and the other ends are connected to the second connecting rod.

In one embodiment of the present invention, the first connecting rod and the third connecting rod are abutted against a stop portion of the first slide and a stop portion of the second slide, so as to change a center distance between the right ocular portion and the left ocular portion.

In one embodiment of the present invention, the casing further comprises a first adjustment portion and a second adjustment portion, the first adjustment portion can drive the first connecting rod, and the second adjustment portion can drive the third connecting rod.

In one embodiment of the present invention, the single-tube binocular eyepiece assembly further comprises an interpupillary distance adjustment apparatus, disposed in the casing. The interpupillary distance adjustment apparatus comprises: a gear unit, wherein the gear unit comprises a first tooth-row, a second tooth-row, and a gear, the first tooth-row and the second tooth-row are disposed opposite to each other, and the gear is separately meshed with the first tooth-row and the second tooth-row.

In one embodiment of the present invention, the casing further comprises a first adjustment portion and a second adjustment portion, the first adjustment portion can drive the first tooth-row, and the second adjustment portion can drive the second tooth-row.

The present invention provides further provides a single-tube binocular telescope, that comprises a single-tube objective tube, comprising an objective lens optical unit and the single-tube binocular eyepiece assembly according to above said embodiment, coupled to the single-tube objective tube.

The present invention may further provide a single-tube binocular telescope, including: a single-tube objective tube and the single-tube binocular eyepiece assembly of any one of the foregoing embodiments. The objective tube includes an objective lens optical unit, and the single-tube binocular eyepiece assembly is coupled to the single-tube objective tube.

The present invention provides a single-tube binocular eyepiece assembly that is light and that has a simple optical path design, and the single-tube binocular eyepiece assembly may be matched with an objective tube, and is applied to a common telescope.

One objective of the present invention is to provide a binocular eyepiece assembly that may be used in a single-tube telescope and that may enable more comfortable observation for a user. In addition, anther objective of the present invention is to provide a single-tube binocular eyepiece assembly that is designed with a structure and an optical path that are complete and simple, and that may be miniaturized, and a single-tube telescope matched with the single-tube binocular eyepiece assembly.

DETAILED DESCRIPTION

Figure 1:
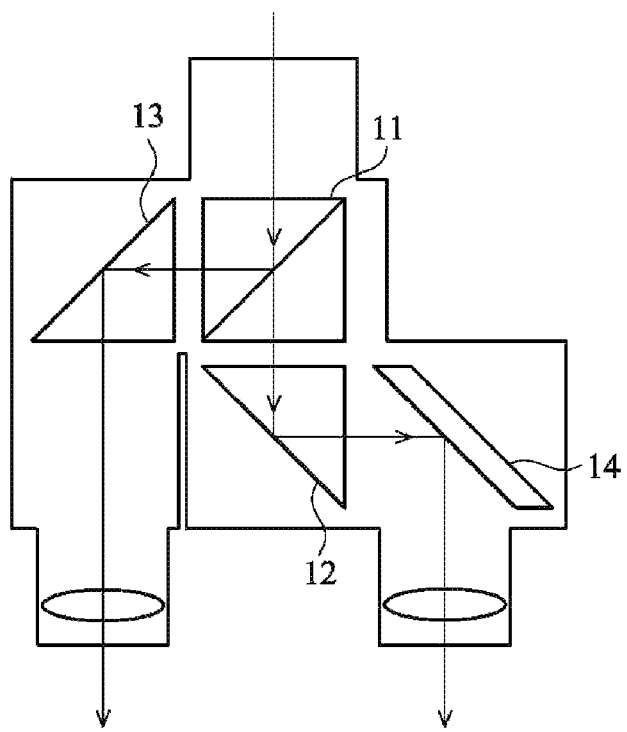
FIG. 1 is a schematic diagram of a partial optical member of a conventional binocular telescope.
Figure 2:
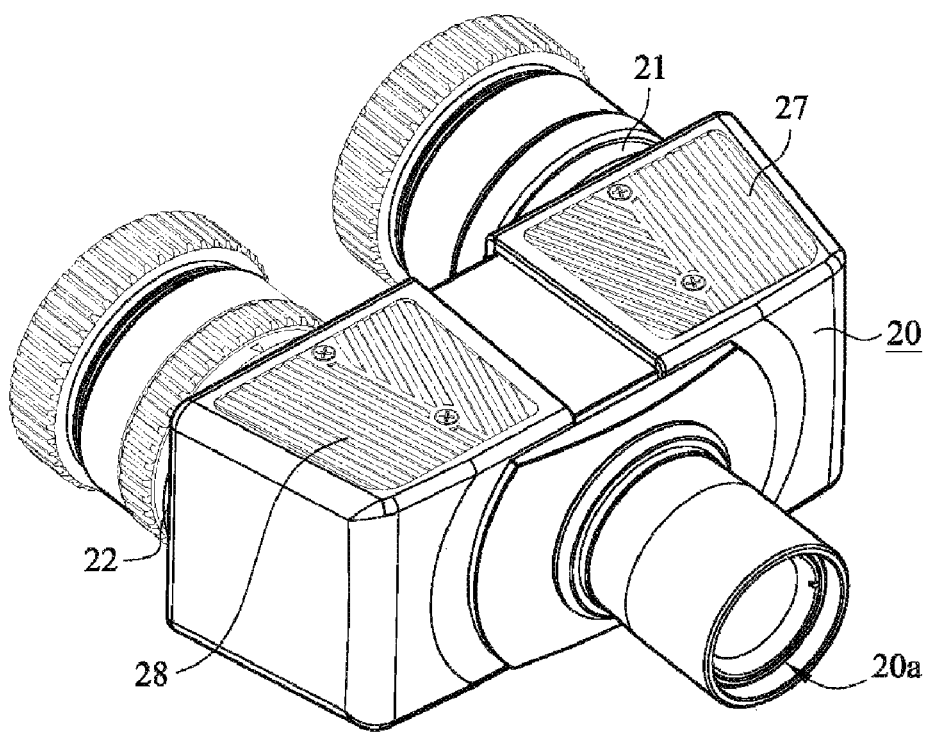
FIG. 2 is a schematic three-dimensional diagram of a single-tube binocular eyepiece assembly according to the present invention.
Figure 3A:
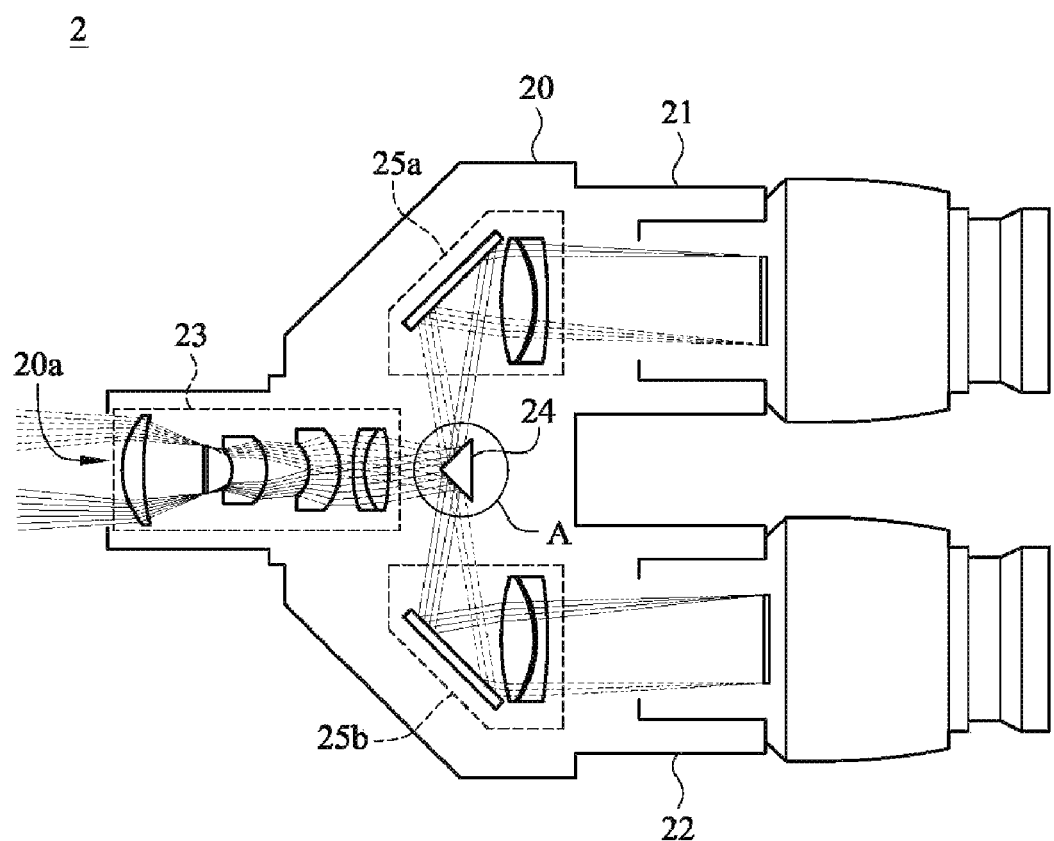
FIG. 3A is a schematic diagram of an internal component and an optical path in FIG. 2.
Figure 3B:
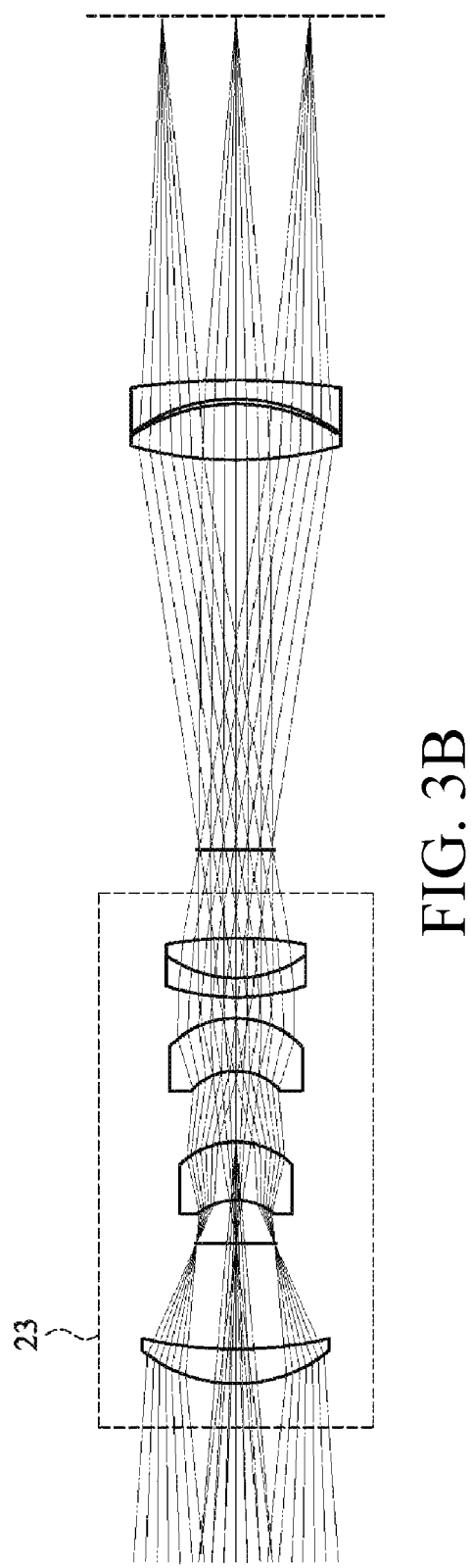
FIG. 3B is a schematic diagram of an optical path of an optical lens assembly in FIG. 3A.
Figure 4:
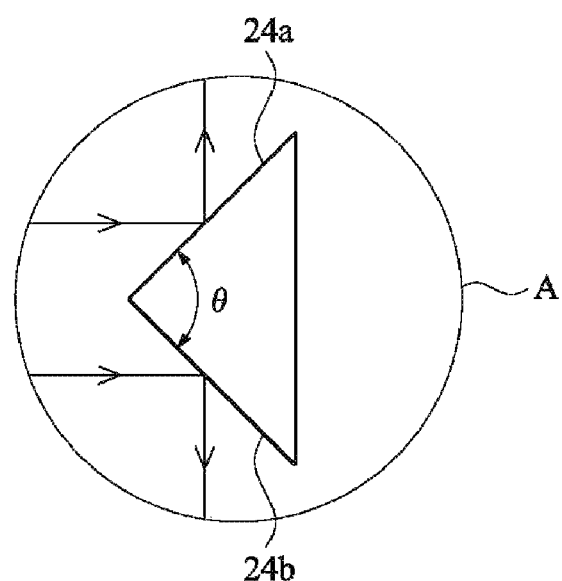
FIG. 4 is a schematic enlarged diagram of a beam splitting prism in FIG. 3A.

First, referring to FIG. 2 to FIG. 4, FIG. 2 is a schematic three-dimensional diagram of a single-tube binocular eyepiece assembly according to the present invention. FIG. 3A is a schematic diagram of an internal component and an optical path in FIG. 2. FIG. 3B is a schematic diagram of an optical path of an optical lens assembly in FIG. 3A. FIG. 4 is a schematic enlarged diagram of a beam splitting prism in FIG. 3A. Further, FIG. 4 is a schematic enlarged diagram of a frame A in FIG. 3A, and FIG. 3B is a schematic diagram of imaging when an exemplary optical lens assembly is used independently.

This embodiment is a single-tube binocular eyepiece assembly 2, which may be matched with a single-tube telescope for use. The single-tube telescope, for example, may be a terrestrial telescope or a portable observation telescope, but is not limited thereto.

The single-tube binocular eyepiece assembly 2 may include at least: a casing 20, an optical lens assembly 23, a beam splitting prism 24, a first reflecting mirror assembly 25a, and a second reflecting mirror assembly 25b. By means of coordination of these members, the single-tube binocular eyepiece assembly 2 may form a small optical system.

The casing 20 includes a right ocular portion 21, a left ocular portion 22, and a light receiving portion 20a. The right ocular portion 21 and the left ocular portion 22 in this embodiment may be used in cooperation with a conventional eyepiece in the market, and may be replaced with different eyepieces by a user according to different scenarios, requirements, and habits. Therefore, flexibility of the overall matching is improved. The right ocular portion 21 and the left ocular portion 22 will respectively correspond to the left eye and the right eye of the user. By means of imaging at the eyepiece, images are transmitted to the left and right eyes of the user. The light receiving portion 20a maybe coupled with an objective lens of a conventional single-tube telescope, so that when the matched single-tube telescope is used for observation, both eyes may be used for observation.

The following first describes an internal optical path of the single-tube binocular eyepiece assembly 2, and descriptions of mechanisms of the single-tube binocular eyepiece assembly 2 are provided later. Moreover, for ease of indication, some internal members have been omitted.

The optical lens assembly 23, the beam splitting prism 24, the first reflecting mirror assembly 25a, and the second reflecting mirror assembly 25b are all disposed in the casing 20. After entering the optical lens assembly 23, a beam is transmitted to the optical lens assembly 23. After adjusting the focus, aberration, chromatic aberration, astigmatism, dispersion and the like of the beam received from the light receiving portion 20a, the optical lens assembly 23 may transmit the beam to the beam splitting prism 24. Specifically, apart from adjusting the chromatic aberration and aberration, the optical lens assembly 23 of this embodiment may also change an incident angle of a light ray, so that after leaving the optical lens assembly 23, the light ray is turned by 180 degrees in a vertical direction and a horizontal direction, and forms a full circle erect image. An actual adjustment manner is adjusted according to different optical requirements. Details are not particularly described herein.

The beam splitting prism 24 may be a tapered prism, and the beam splitting prism 24 includes at least a first reflecting surface 24a and a second reflecting surface 24b. Moreover, two surfaces, namely, the first reflecting surface 24a and the second reflecting surface 24b, may form a vertex angle θ, and the vertex angle θ in this embodiment is a right angle. The vertex angle θ is disposed on an optical axis of the beam splitting prism 24. Through the optical lens assembly 23, the beam may be transmitted to both the first reflecting surface 24a and the second reflecting surface 24b, and reflected by the first reflecting surface 24a and the second reflecting surface 24b. Preferably, by means of this setting, the incident beam is averagely split by the optical lens assembly 23 into two equal sub-beams, which enter the right ocular portion 21 and the left ocular portion 22 respectively after being reflected by the first reflecting mirror assembly 25a and the second reflecting mirror assembly 25b.

In view of a forward direction of the beam, the light receiving portion 20a of this embodiment receives a beam. Then, the beam is sequentially transmitted to the optical lens assembly 23 and the beam splitting prism 24. The optical lens assembly 23 transmits the beam to the first reflecting surface 24a and the second reflecting surface 24b of the beam splitting prism 24 (referring to the schematic diagram of the optical path in the figure). In this specification, it is first noted that, for ease of description, particularly, a beam reflected by the first reflecting surface 24a is defined as a first beam, and a beam reflected by the second reflecting surface 24b is defined as a second beam. After passing through the first reflecting surface 24a and the first reflecting mirror assembly 25a sequentially, the first beam is transmitted to the right ocular portion 21, and after passing through the second reflecting surface 24b and the second reflecting mirror assembly 25b sequentially, the second beam is transmitted to the left ocular portion 22.

Particularly referring to FIG. 3A, after passing through the optical lens assembly 23, the beam splitting prism 24, the first reflecting surface 24a, and the first reflecting mirror assembly 25a, an upper beam (represented by dashed lines) entering from the light receiving portion 20a on the left side is transformed from originally forming an inverted image to forming an erect image (being inverted in both a vertical direction and a horizontal direction). A first image formed by the first beam through the first reflecting mirror assembly is the erect image. Similarly, after passing through the optical lens assembly 23, the beam splitting prism 24, and the second reflecting mirror assembly 25b, the second beam (a lower beam represented by solid lines) is also transformed from originally forming an inverted image to forming an erect image. By means of this configuration, different from a conventional eyepiece assembly, in the present invention, no additional erecting prism assembly needs to be configured. Therefore, the objective of providing a single-tube binocular eyepiece assembly is that a structure and an optical path that are complete and simple, and that may be miniaturized can be achieved.

It should be additionally noted that, in the present invention, the optical lens assembly 23 completely transmits a beam and averagely splits the beam into a first beam and a second beam (each beam is averagely split into two sub-beams) by the first reflecting surface 24a and the second reflecting surface 24b of the beam splitting prism 24. Therefore, the first image and the second image formed by the first beam and the second beam are images that are the same and complete. That is, a complete image can be seen from either a left eyepiece or a right eyepiece. Different from the prior art in which two different sub-images are formed at left and right eyes, the two sub-images are half images, and the user can observe a complete image only by receiving the two sub-images with two eyes. An additional benefit of this approach in the present invention is that a complete observation image can be observed from any ocular portion, and practicability of the present invention is further improved.

It should be additionally noted that, for ease of indication, in this embodiment, a forward direction and a characteristic of a beam are indicated by using only some line segments, which are only used for indication rather than limiting the shape, property, or other optical properties of the beam of this application in the future.

Figure 5:
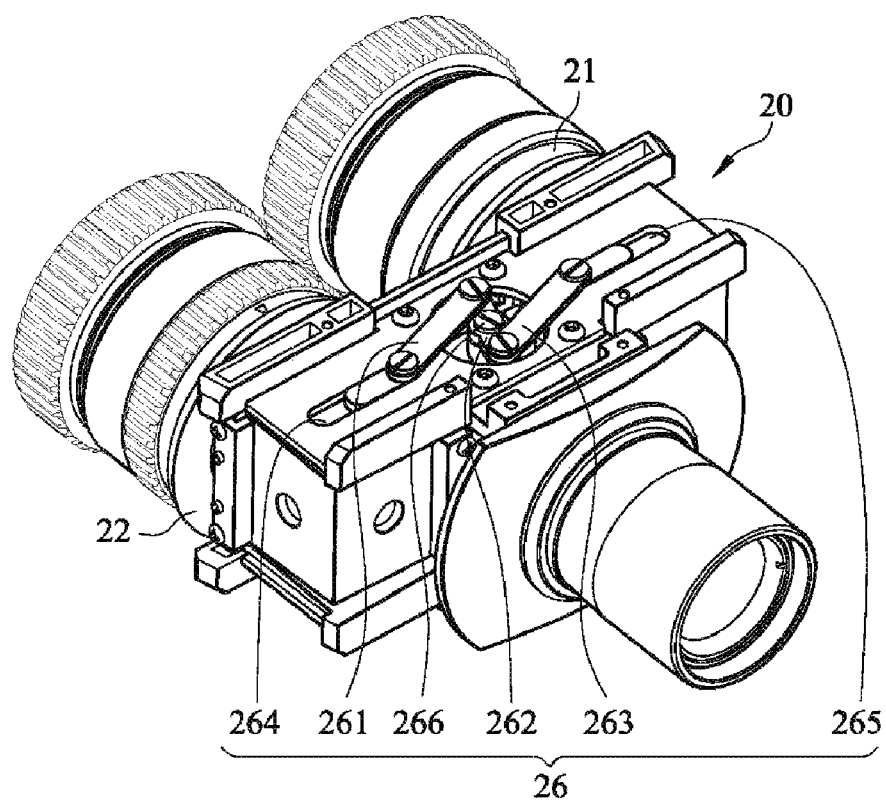
FIG. 5 is a schematic three-dimensional diagram in FIG. 2 with a part of the casing omitted.
Figure 6:
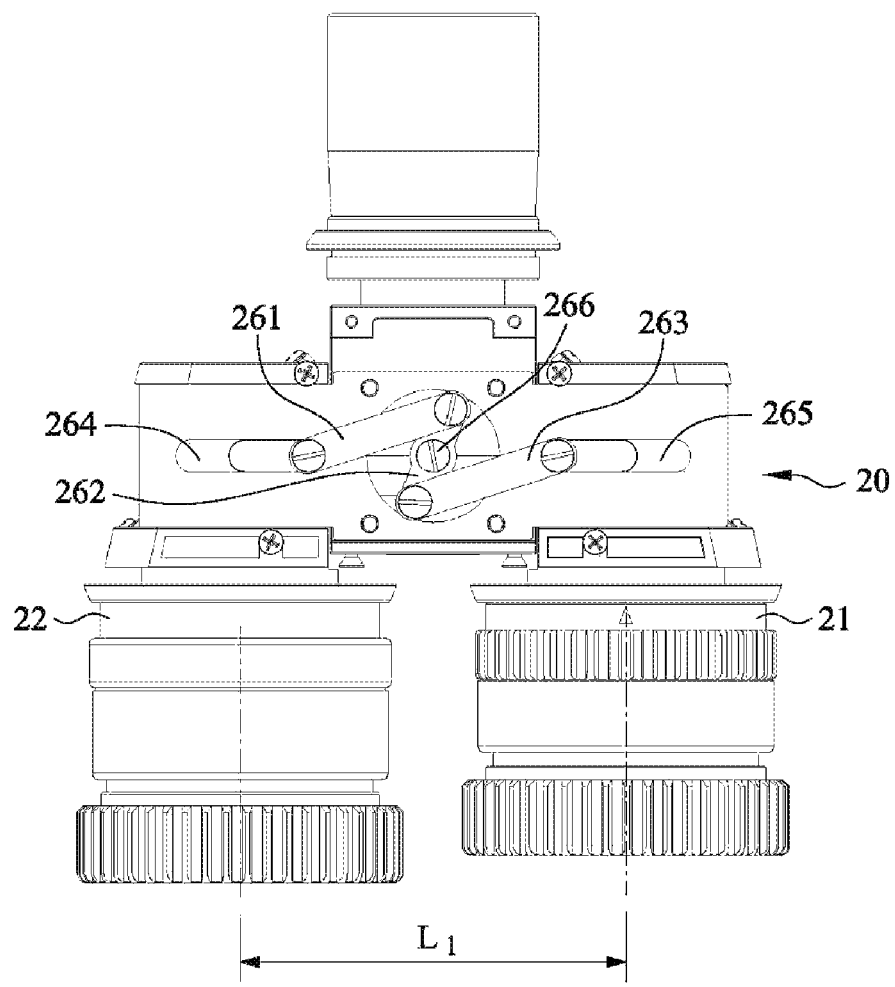
FIG. 6 is a top view of the single-tube binocular eyepiece assembly in FIG. 5 that is adjusted to a minimum interpupillary distance.
Figure 7:
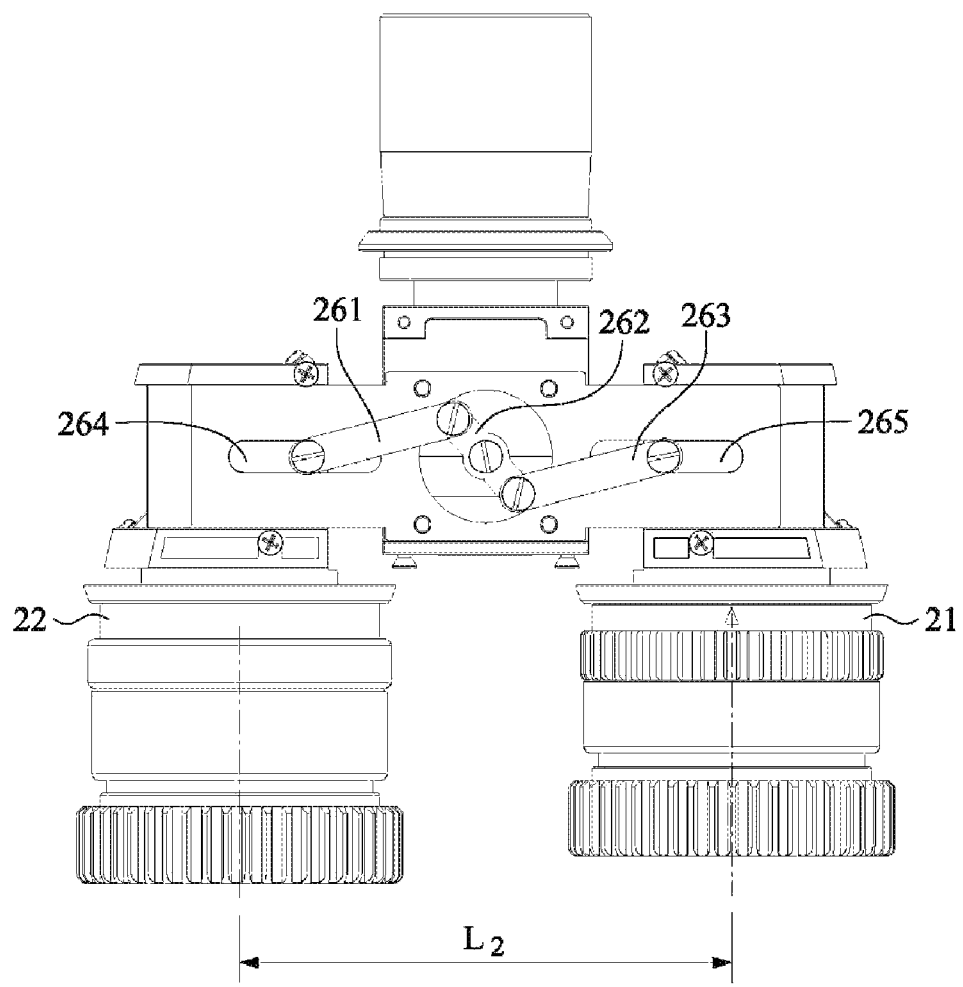
FIG. 7 is a top view of the single-tube binocular eyepiece assembly in FIG. 5 that is adjusted to a maximum interpupillary distance.

Next, referring to FIG. 5 to FIG. 7, FIG. 5 is a schematic three-dimensional diagram in FIG. 2 with a part of the casing omitted. FIG. 6 is a top view of the single-tube binocular eyepiece assembly in FIG. 5 that is adjusted to a minimum interpupillary distance. FIG. 7 is a top view of the single-tube binocular eyepiece assembly in FIG. 5 that is adjusted to a maximum interpupillary distance.

Then, how to adjust the interpupillary distance is described in an embodiment of the present invention. Apart from the foregoing members, the single-tube binocular eyepiece assembly 2 of the present invention may further include an interpupillary distance adjustment apparatus 26. The interpupillary distance adjustment apparatus 26 is disposed in the casing 20, and is used to adjust a distance between the right ocular portion 21 and the left ocular portion 22, so that the user can make adjustments according to a habit of the user and a requirement of the interpupillary distance.

Still referring to FIG. 5, the interpupillary distance adjustment apparatus 26 of this embodiment includes a connecting rod unit and a slide unit. The connecting rod unit is matched with the slide unit to change relative positions of the right ocular portion 21 and the left ocular portion 22.

Specifically, the connecting rod unit may include at least: a first connecting rod 261, a second connecting rod 262, and a third connecting rod 263. Two ends of the second connecting rod 262 are respectively connected to the first connecting rod 261 and the third connecting rod 263. The second connecting rod 262 maybe pivoted in the casing by using a pivot component 266, so that the second connecting rod 262 can rotate around the pivot component 266 as an axis. The slide unit includes a first slide 264 and a second slide 265. A part of the first connecting rod 261 is disposed in the first slide 264, a part of the third connecting rod 263 is disposed in the second slide 265, and the other ends are connected to the second connecting rod 262.

When moving along the first slide 264, the first connecting rod 261 drives the drive second connecting rod 262 to rotate. In this case, the second connecting rod 262 drives the third connecting rod 263 to move along the second slide 265, so that the first connecting rod 261 and the third connecting rod 263 can move along the slides to the left and to the right in a sliding manner. On the contrary, when moving along the second slide 265, the third connecting rod 263 also drives the second connecting rod 262 to rotate, so that the first connecting rod 261 moves along the first slide 264.

The first connecting rod 261 and the third connecting rod 263 are abutted against a stop portion (not shown in the figure) of the first slide 264 and a stop portion (not shown in the figure) of the second slide 265, so as to change a center distance between the right ocular portion 21 and the left ocular portion 22. When being abutted against the stop portion of the first slide 264, the first connecting rod 261 may drive the left ocular portion 22 to move, and when being abutted against the second slide 265, the third connecting rod 263 may drive the right ocular portion 21 to move. It should be additionally noted that the left ocular portion 22 and the right ocular portion 21 simultaneously move relatively. A distance (that is, a papillary distance or an interpupillary distance) between optical axis of the left ocular portion 22 and the right ocular portion 21 may be adjusted. FIG. 6 shows a use aspect in which an exemplary interpupillary distance $L_1$ is a shortest distance, and the shortest distance in this embodiment is 58 millimeters, but is not limited thereto. FIG. 7 shows a use aspect in which an exemplary interpupillary distance $L_2$ is a longest distance, and the longest distance in this embodiment is 74 millimeters, but, similarly, is not limited thereto.

The casing 20 further includes a first adjustment portion 27 and a second adjustment portion 28. The first adjustment portion 27 can drive the first connecting rod 261, and the second adjustment portion 28 can drive the third connecting rod 263. That is, during use, the user holds the ocular portion with four fingers, and pushes the first adjustment portion 27 or the second adjustment portion 28 with a thumb, so that the first adjustment portion 27 can drive the first connecting rod 261, and the second adjustment portion 28 can drive the third connecting rod 263, so as to drive the left ocular portion 22 and the right ocular portion 21 to move relatively (increase an interpupillary distance or decrease an interpupillary distance).

Figure 8:
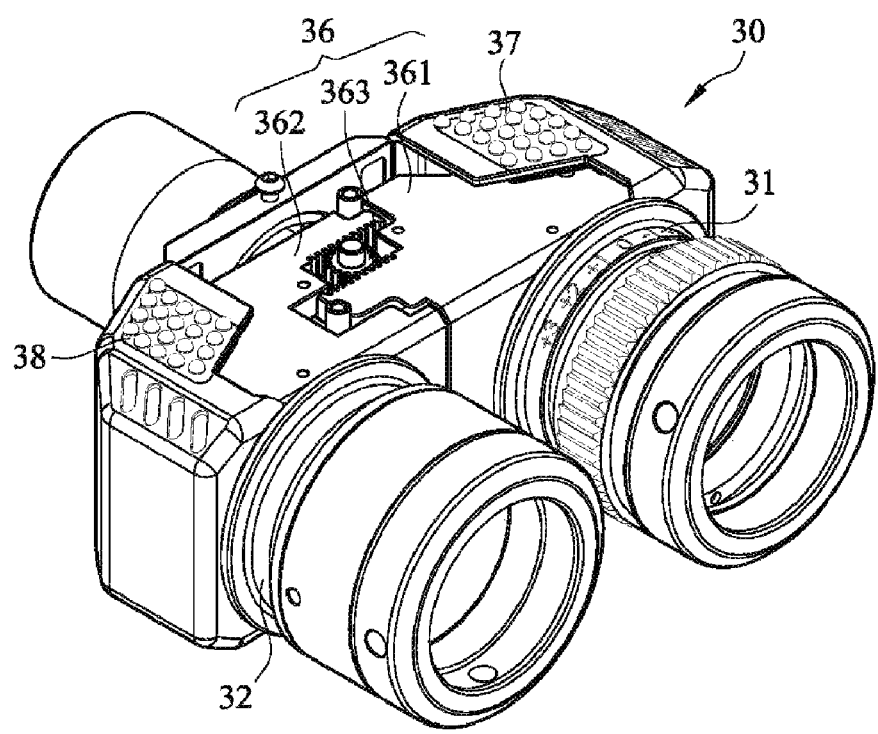
FIG. 8 is a schematic three-dimensional diagram of another embodiment of a single-tube binocular eyepiece assembly according to the present invention.
Figure 9:
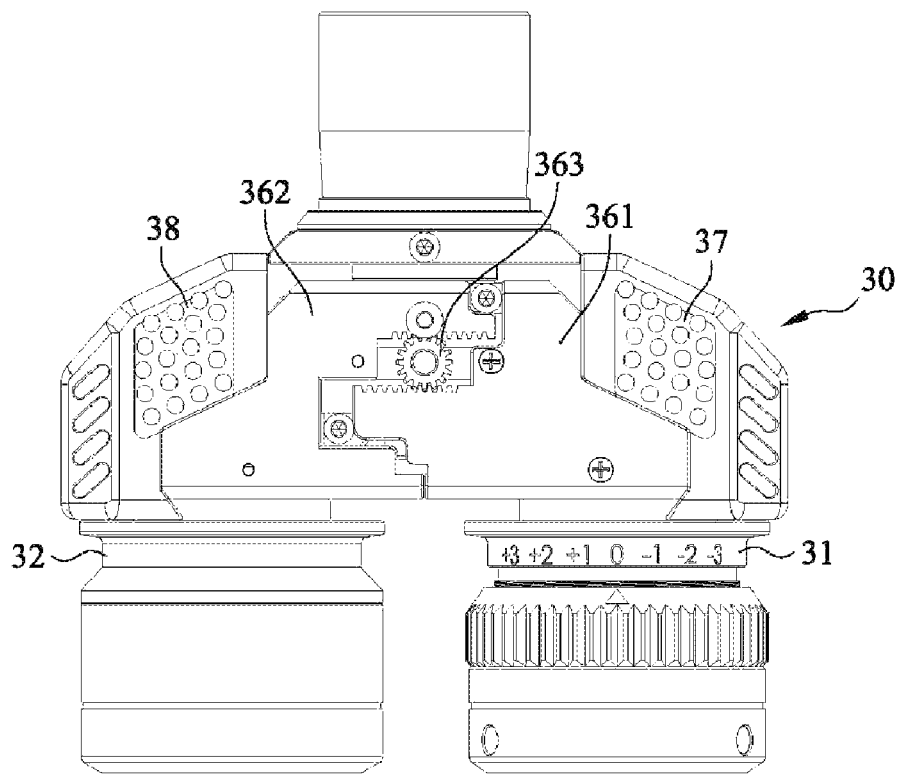
FIG. 9 is a top view of the single-tube binocular eyepiece assembly in FIG. 8 that is adjusted to a minimum interpupillary distance.
Figure 10:
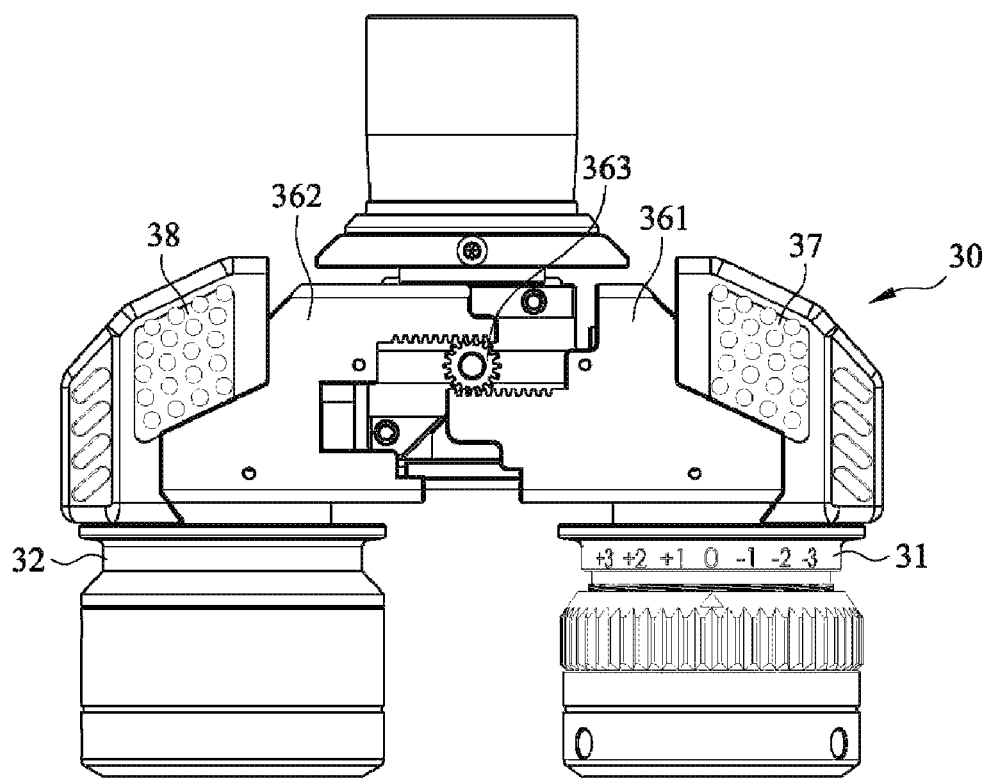
FIG. 10 is a top view of the single-tube binocular eyepiece assembly in FIG. 8 that is adjusted to a maximum interpupillary distance.

Then, referring to FIG. 8 to FIG. 10, FIG. 8 is a schematic three-dimensional diagram of another embodiment of a single-tube binocular eyepiece assembly according to the present invention. FIG. 9 is a top view of the single-tube binocular eyepiece assembly in FIG. 8 that is adjusted to a minimum interpupillary distance. FIG. 10 is a top view of the single-tube binocular eyepiece assembly in FIG. 8 that is adjusted to a maximum interpupillary distance.

Because internal optical construction of this embodiment is similar to that of the foregoing embodiments, the internal optical path and structure are no longer described, and only construction of an interpupillary distance adjustment apparatus of this embodiment is described.

Similar to the foregoing embodiments, this embodiment also includes an interpupillary distance adjustment apparatus 36, disposed in the casing 30. Different from the foregoing technology, in which a sliding rod is used, this embodiment produces an effect similar to that of the foregoing embodiments by using a gear. Specifically, the interpupillary distance adjustment apparatus 36 of this embodiment includes a gear unit. The gear unit includes a first tooth-row 361, a second tooth-row 362, and a gear 363, the first tooth-row 361 and the second tooth-row 362 are disposed opposite to each other, and the gear 363 is separately meshed with the first tooth-row 361 and the second tooth-row 362. The gear 363 is fixedly connected to the casing by using a rotating shaft, and by means of the gear 363, the first tooth-row 361 and the second tooth-row 362 may linearly move relatively.

Specifically, the gear 363 is meshed with both the first tooth-row 361 and the second tooth-row 362, so as to drive the first tooth-row 361 and the second tooth-row 362 to respectively move in opposite directions.

FIG. 9 shows a use aspect in which an interpupillary distance is adjusted to a shortest distance in this embodiment. FIG. 10 shows a use aspect in which an interpupillary distance is adjusted to a longest distance in this embodiment.

Similar to the foregoing embodiments, the casing 30 of this embodiment also includes a first adjustment portion 37 and a second adjustment portion 38. The first adjustment portion 37 can drive the first tooth-row 361, and the second adjustment portion 38 can drive the second tooth-row 362. That is, during use, the user holds the ocular portion with four fingers, and pushes the first adjustment portion 37 and the second adjustment portion 38 with thumbs, so that the first adjustment portion 37 can drive the first tooth-row 361, and the second adjustment portion 38 can drive the second tooth-row 362, so as to drive the left ocular portion 32 and the right ocular portion 31 to move relatively (increase an interpupillary distance or decrease an interpupillary distance).

Figure 11:
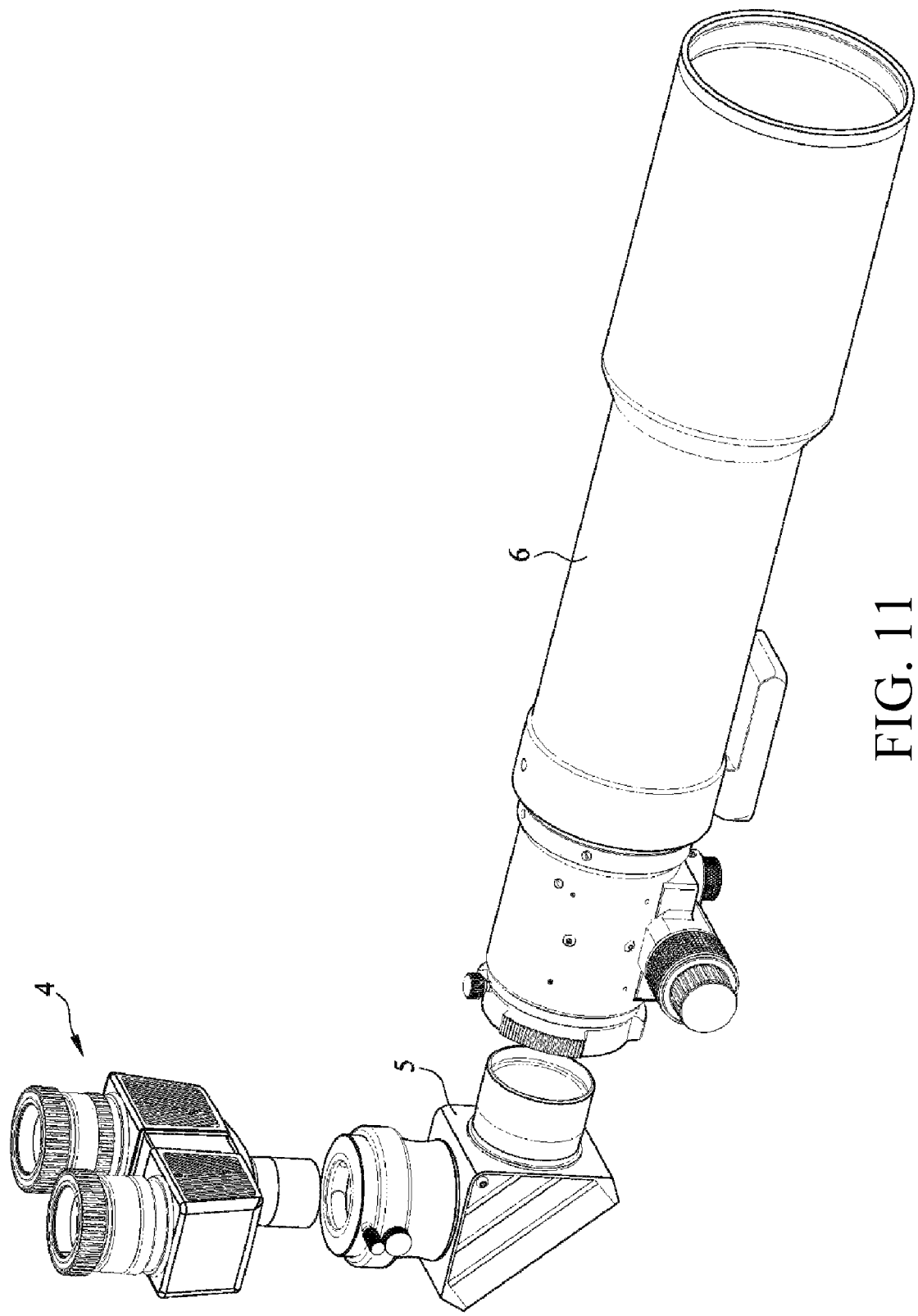
FIG. 11 is a three-dimensional diagram of a binocular telescope according to the present invention.

Finally, referring to FIG. 11, FIG. 11 is a three-dimensional diagram of a binocular telescope according to the present invention. This embodiment shows the single-tube binocular eyepiece assembly of any one of the foregoing embodiments, an objective tube, and an adapter ring.

The present invention may further provide a binocular telescope. The figure shows a terrestrial telescope. But in an implementation aspect, it may also be designed into a portable telescope that is easy to carry. The binocular telescope includes at least: a single-tube objective tube 6 and the single-tube binocular eyepiece assembly 4 of any one of the foregoing embodiments. The objective tube 6 includes an objective lens optical unit (not shown in the figure), and the single-tube binocular eyepiece assembly 4 is coupled to the single-tube objective tube. In addition, the single-tube objective tube 6 and the single-tube binocular eyepiece assembly 4 in this embodiment further include an adapter 5. Further, the single-tube binocular eyepiece assembly 4 is coupled to the single-tube objective tube 6 by using the adapter 5.

The structure and the internal component relationship of the single-tube binocular eyepiece assembly 4 have been described in the foregoing embodiments, and details are not described again.

Figure 12:
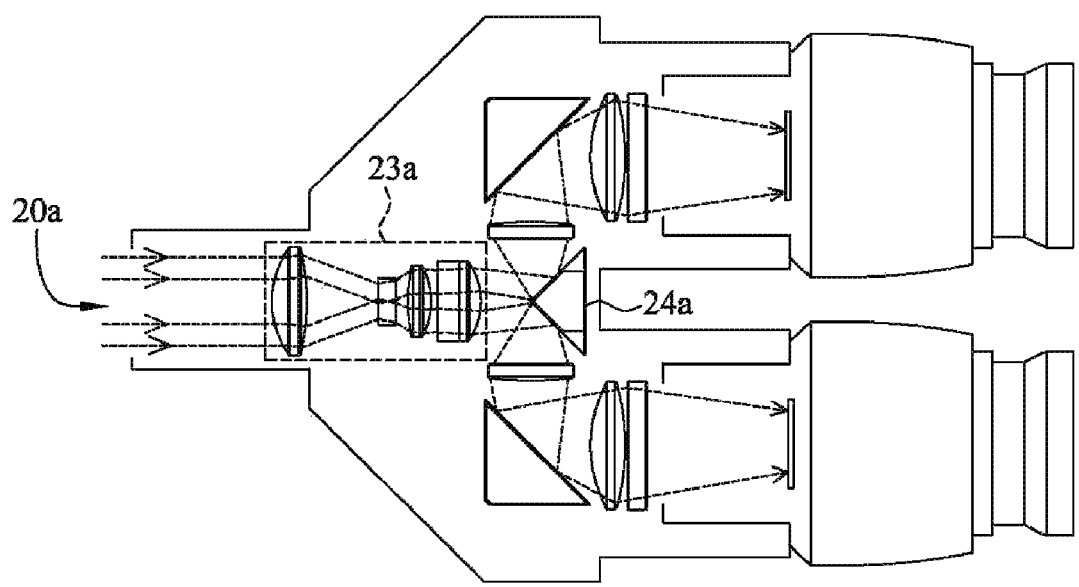
FIG. 12 is a schematic diagram of an internal optical path of another optical lens assembly of a single-tube binocular eyepiece assembly according to the present invention.

Finally, referring to FIG. 12, FIG. 12 is a schematic diagram of an internal optical path of another optical lens assembly 23a of a single-tube binocular eyepiece assembly 2a according to the present invention. Further, FIG. 12 shows another possible combination of the optical lens assembly 23a. After entering the optical lens assembly 23a, a beam is transmitted to the beam splitting prism 24a. After adjusting the focus, aberration, chromatic aberration, astigmatism, dispersion and the like of the beam received from the light receiving portion 20a, the optical lens assembly 23a may transmit the beam to the beam splitting prism 24a. The beam splitting prism 24a averagely splits the beam received by the light receiving portion 20a into two sub-beams, and transmits the two sub-beams to the left ocular portion and the right ocular portion. Therefore, the optical lens assembly 23a in FIG. 12 can produce an optical effect similar to that in FIG. 3A.

It should be additionally noted that, for ease of indication, in this embodiment, a forward direction and a characteristic of a beam are indicated by using only some line segments, which are only used for indication rather than limiting the shape, property, or other optical properties of the beam of this application in the future.

In conclusion, in the present invention, a beam splitting prism is configured on an optical axis of an optical lens, so that an incident beam may be averagely distributed to a left ocular portion and a right ocular portion. In addition, by means of an optical system of the embodiments, an image can be completely formed on the left ocular portion and the right ocular portion separately. Therefore, a user can observe through both the left ocular portion and the right ocular portion to achieve an objective of providing a single-tube binocular eyepiece assembly that can enable more comfortable observation and using for the user, and a telescope matched with the single-tube binocular eyepiece assembly. In addition in the present invention, replacing a conventional beam splitter with the beam splitting prism has at least the following advantages: The beam splitting prism needs to be coated on only two sides, and does not need to be partially coated in consideration of a splitting ratio as the conventional beam splitter does, so that an splitting effect is better. In addition, because the volume of the beam splitting prism is smaller than that of the beam splitter, and an optical path is complete and simple, the objective of providing a single-tube binocular eyepiece assembly that a structure and an optical path that are complete and simple, and that may be miniaturized can be achieved.

What is claimed is:

1. A single-tube binocular eyepiece assembly for a single-tube telescope, comprising:
   a casing, comprising a right ocular portion, a left ocular portion, and a light receiving portion;
   an optical lens assembly, disposed in the casing;
   a beam splitting prism, disposed in the casing, wherein the beam splitting prism is disposed on an optical axis of the optical lens assembly, the beam splitting prism comprises a first reflecting surface, a second reflecting surface, and a vertex angle, the first reflecting surface and the second reflecting surface form the vertex angle, and the vertex angle is a right angle;
   a first reflecting mirror assembly, disposed in the casing; and
   a second reflecting mirror assembly, disposed in the casing,
   wherein the light receiving portion receives a beam, the beam is sequentially transmitted to the optical lens assembly and the beam splitting prism, the beam is focused on both the first reflecting surface and the second reflecting surface of the beam splitting prism by the optical lens assembly, the beam reflected by the first reflecting surface is defined as a first beam, the beam reflected by the second reflecting surface is defined as a second beam, the first beam is transmitted to the first reflecting mirror assembly, and the second beam is transmitted to the second reflecting mirror assembly, wherein the first beam forms a first image through the first reflecting mirror assembly, the second beam forms a second image through the second reflecting mirror assembly, and the first image and the second image are the same.

2. The single-tube binocular eyepiece assembly according to claim 1, wherein the beam transmitted to the optical lens assembly is turned by 180 degrees in a vertical direction and turned by 180 degrees in a horizontal direction.

3. The single-tube binocular eyepiece assembly according to claim 1, wherein the beam transmitted to the optical lens assembly forms a full circle erect image.

4. The single-tube binocular eyepiece assembly according to claim 2, wherein the beam transmitted to the optical lens assembly forms a full circle erect image.

5. The single-tube binocular eyepiece assembly according to claim 1, further comprising an interpupillary distance adjustment apparatus, disposed in the casing, wherein the interpupillary distance adjustment apparatus comprises:

a connecting rod unit, wherein the connecting rod unit comprises a first connecting rod, a second connecting rod, and a third connecting rod, two ends of the second connecting rod are separately connected to the first connecting rod and the third connecting rod, and the second connecting rod is pivoted in the casing by using a pivot component, so that the second connecting rod rotates around the pivot component as an axis; and a slide unit, comprising a first slide and a second slide, wherein a part of the first connecting rod is disposed in the first slide, a part of the third connecting rod is disposed in the second slide, and the other ends are connected to the second connecting rod.

6. The single-tube binocular eyepiece assembly according to claim 5, wherein the first connecting rod and the third connecting rod are abutted against a stop portion of the first slide and a stop portion of the second slide, so as to change a center distance between the right ocular portion and the left ocular portion.

7. The single-tube binocular eyepiece assembly according to claim 6, wherein the casing further comprises a first adjustment portion and a second adjustment portion, the first adjustment portion drives the first connecting rod, and the second adjustment portion drives the third connecting rod.

8. The single-tube binocular eyepiece assembly according to claim 1, further comprising an interpupillary distance adjustment apparatus, disposed in the casing, wherein the interpupillary distance adjustment apparatus comprises:
   a gear unit, wherein the gear unit comprises a first tooth-row, a second tooth-row, and a gear, the first tooth-row and the second tooth-row are disposed opposite to each other, and the gear is separately meshed with the first tooth-row and the second tooth-row.

9. The single-tube binocular eyepiece assembly according to claim 8, wherein the casing further comprises a first adjustment portion and a second adjustment portion, the first adjustment portion drives the first tooth-row, and the second adjustment portion drives the second tooth-row.

10. A single-tube binocular telescope, comprising:
    a single-tube objective tube, comprising an objective lens optical unit; and
    the single-tube binocular eyepiece assembly, that coupled to the single-tube objective tube, the single-tube binocular eyepiece assembly comprising:
    a casing, comprising a right ocular portion, a left ocular portion, and a light receiving portion;
    an optical lens assembly, disposed in the casing;
    a beam splitting prism, disposed in the casing, wherein the beam splitting prism is disposed on an optical axis of the optical lens assembly, the beam splitting prism comprises a first reflecting surface, a second reflecting surface, and a vertex angle, the first reflecting surface and the second reflecting surface form the vertex angle, and the vertex angle is a right angle;
    a first reflecting mirror assembly, disposed in the casing; and
    a second reflecting mirror assembly, disposed in the casing,
    wherein the light receiving portion receives a beam, the beam is sequentially transmitted to the optical lens assembly and the beam splitting prism, the beam is focused on the first reflecting surface and the second reflecting surface of the beam splitting prism by the optical lens assembly, the beam reflected by the first reflecting surface is defined as a first beam, the beam reflected by the second reflecting surface is defined as a second beam, the first beam is transmitted to the first reflecting mirror assembly, and the second beam is transmitted to the second reflecting mirror assembly, wherein the first beam forms a first image through the first reflecting mirror assembly, the second beam forms a second image through the second reflecting mirror assembly, and the first image and the second image are the same.

11. The single-tube binocular telescope according to claim 10, wherein the beam transmitted to the optical lens assembly is turned by 180 degrees in a vertical direction and turned by 180 degrees in a horizontal direction.

12. The single-tube binocular telescope according to claim 10, wherein the beam transmitted to the optical lens assembly forms a full circle erect image.

13. The single-tube binocular telescope, according to claim 11, wherein the beam transmitted to the optical lens assembly forms a full circle erect image.

14. The single-tube binocular telescope according to claim 10 further comprising an interpupillary distance adjustment apparatus, disposed in the casing, wherein the interpupillary distance adjustment apparatus comprises:

a connecting rod unit, wherein the connecting rod unit comprises a first connecting rod, a second connecting rod, and a third connecting rod, two ends of the second connecting rod are separately connected to the first connecting rod and the third connecting rod, and the second connecting rod is pivoted in the casing by using a pivot component, so that the second connecting rod rotates around the pivot component as an axis; and a slide unit, comprising a first slide and a second slide, wherein a part of the first connecting rod is disposed in the first slide, a part of the third connecting rod is disposed in the second slide, and the other ends are connected to the second connecting rod.

* * * * *